Sept. 23, 1952     I. KALIKOW     2,611,450
LUBRICANT FITTING
Filed Jan. 27, 1951
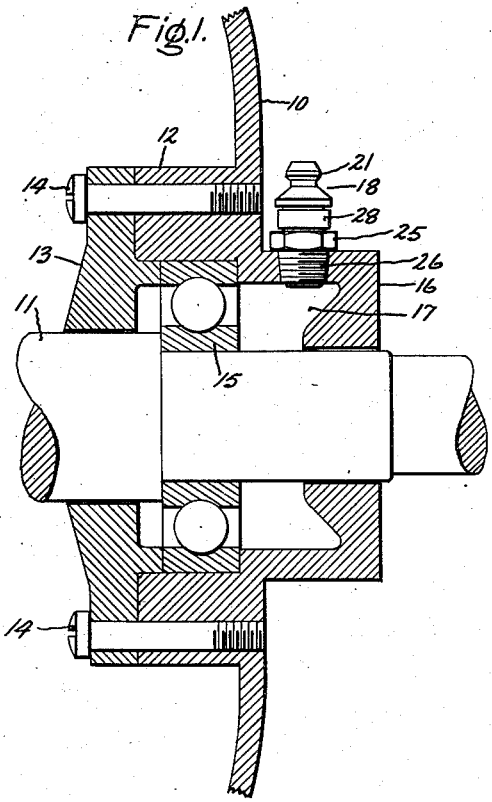
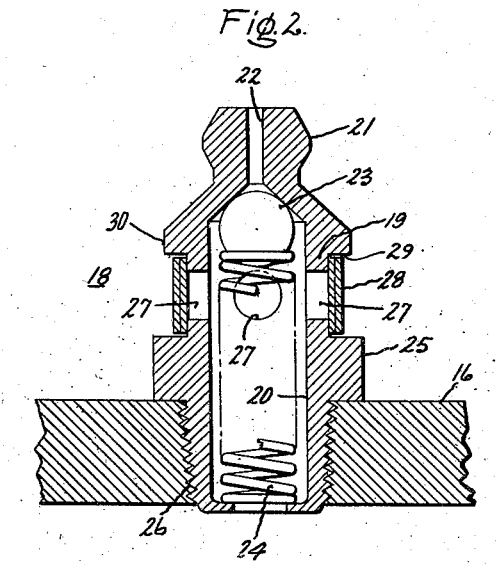
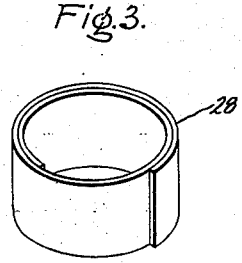
Inventor:
Irving Kalikow,
by Ernest C. Britton
His Attorney.

Patented Sept. 23, 1952

2,611,450

UNITED STATES PATENT OFFICE 2,611,450

LUBRICANT FITTING

Irving Kalikow, Swampscott, Mass., assignor to General Electric Company, a corporation of New York Application January 27, 1951, Serial No. 208,154

3 Claims. (Cl. 184—105)

This invention relates to lubricant fittings and more particularly to a unitary lubricant receiving and pressure relief device such as for a dynamoelectric machine bearing.

In the design of machinery of any appreciable size, such as integral horsepower electric motors, it is generally believed that the antifriction bearings should be greased at intervals commensurate with their size and service. It is recognized as desirable to provide an easy means of regreasing when necessary so that the machinery does not have to be torn apart or the bearing replaced when the life of the lubricant is ended. In many applications, however, it is essential that the equipment be not over lubricated and this is particularly true of electric motors where an excess of oil or grease supplied to the bearing housing is quite likely to be forced around the shaft clearance and into the motor windings or around a commutator and brushes or other electrical parts likely to be deleteriously affected by oil or grease. It has been known in the past to use a pressure relief plug so that excess and old lubricant can be purged from the lubricant housing but it is also known that the operator may fail to remove such a plug, or it may become lost and the opening provided therefor may allow contamination from the outside.

It is an object of the present invention to provide simple and inexpensive means for overcoming the above-mentioned difficulties.

A further object of the present invention is to provide a unitary lubricant receiving and lubricant pressure relief device of simple but adequate construction.

A further object of this invention is to provide a lubricant receiving and relief fitting of improved design to allow large relief opening area, self-cleaning relief holes, and positive lubricant retention below a predetermined lubricant pressure to minimize the possibility of contamination from atmospheric gases, water, dirt or other foreign substances.

Further objects and advantages will become apparent and the invention will be better understood from reference to the following description and the accompanying drawing, and the features of novelty which characterize this invention will be pointed out with particularity in the claims annexed to and forming part of this specification.

Broadly stated, in accordance with one aspect of my invention, I provide a unitary lubricant receiving and lubricant pressure relief device comprising a more or less standard nippled lubricant receiving fitting having a tubular body portion with the addition thereto of a plurality of circumferentially spaced ports communicating through the body portion to outside atmosphere except as these ports are completely covered by a circlet spring member constructed and arranged about the ports to effectively close the same until a predetermined pressure is reached in the body portion. A particular type of circlet spring as herein described may be used to provide a constant force deflection characteristic so that there may be a substantially complete seal against loss of lubricant until the predetermined pressure is reached at which time the spring will immediately extend outwardly to completely and simultaneously uncover all of said ports thereby to allow for maximum relief of lubricant pressure.

In the drawing, Fig. 1 is a cross sectional view of a bearing housing such as that for a dynamoelectric machine having the improved lubricant fitting of the invention; Fig. 2 is an enlarged view of the fitting itself; and Fig. 3 is a perspective view of the circlet spring indicated in Figs. 1 and 2.

Referring now to Fig. 1, I have shown an embodiment of my improved lubricant entrance and lubricant pressure relief fitting in connection with a dynamoelectric machine having a stationary frame end shield portion 10 adapted to support a rotatable shaft 11 on which the rotatable member of the machine may be mounted. In the construction shown, the end shield 10 is formed with an inwardly extending circular flange 12 to which a bearing securing cap 13 is secured as by bolts 14. An antifriction ball bearing 15 is interposed between cap 13 and end shield 10 and arranged to support the shaft 11. The bearing cap 13, the flange 12 and an axially-outwardly, radially-inwardly extending annular hub 16 of end shield 10, form a lubricant supply reservoir 17 for retaining lubricant such as oil or grease to be fed to the ball bearing 15. It is desirable to feed without flooding the bearing and without supplying an excessive amount of lubricant which would tend to cause it to exude between the close clearance provided between cap 13 and shaft 11 or between end shield 10 and shaft 11 and in the illustrated arrangement the desired control of feeding of lubricant to the bearing is accomplished through a lubricant entry and pressure relief fitting 18 which is shown in greater detail in Fig. 2.

From Fig. 2 it will be seen that the fitting 18 comprises a tubular body portion 19 having a central bore 20 extending therethrough. At its outer end, the central body portion 19 terminates in a nipple end portion 21, which, in accordance with conventional practice, is adapted to fit a mating part of a lubricating device such as a manually operated pressure gun or a terminus of an automatic pressure lubricating system. Nipple end portion 21 is provided with a central bore 22 communicating with bore 20 which, if desired, may be adapted to be sealed as by a ball check 23 biased outwardly by a coil spring 24 to seal the opening and prevent contamination of the lubricant when fresh lubricant is not being supplied. If desired, the fitting may also be provided with a hexagonal wrench receiving portion 25 and threads 26 for fastening the fitting to a part such as the end shield hub 16.

In order to provide for automatic sealing when internal pressure is low together with an automatic quick relief to discharge lubricant when the internal pressure reaches a predetermined value, I have provided a plurality of ports 27 extending transversely through the central body portion 19 and communicating between the central bore 20 and the outside atmosphere, these ports being completely covered (at low internal pressures) by an overlapping cylindrical circlet 28 of spring material. In order to hold this circlet in place axially, it is nested in an annular groove 29 defined by lands (identified as 30 and 25) on the tubular body. The groove and the associated relief ports 27 are arranged, in the illustrated embodiment, substantially below the grease entrance at nipple 21, so that when discharge occurs through the ports there is no possibility of confusion with grease leakage around the inlet. The plurality of ports 27 provides a large relief opening area so that lubricant may be discharged even faster than it can be introduced to the small bore 22.

The circlet 28 is shown in perspective in Fig. 3. The spring material of the ring may be spring steel or bronze and I have found it advantageous to use a spring made as by dragging the material over a sharp edge to pre-stress it to form a coil in its longitudinal direction such that the spring will be of the type having a force-deflection characteristic which is substantially constant in order that the spring compressive force will cause the circlet to completely cover the ports 27 as the internal pressure gradually rises until the predetermined pressure is reached at which time the spring will suddenly extend outwardly to simultaneously uncover all ports and thus immediately discharge excess lubricant without the internal force having to increase as the spring extends. While I do not mean to limit this invention to a case where such a spring with a constant force with deflection characteristic is used, since for many applications any conventional spring could be used and the small increase in pressure required with deflection would very likely never be noticed, the constant force with deflection characteristic spring circlet has the advantage of assuming a substantially perfect circular shape when released so that it will completely cover a plurality of ports (such as 27) extending through an outwardly circular surface such as that of the bottom of groove 29.

There is thus provided a device of the character described capable of positively and automatically preventing overlubrication. It will also be apparent that the improved pressure receiving and pressure relieving device of the invention is characterized by simplicity and economy of manufacture. Tests have shown that the scheme works perfectly with the overlapping cylindrical relief spring acting to seal four relief holes while the internal pressure is low and acting to quickly extend so as to discharge lubricant simultaneously through all holes when the pressure reaches a desired controlling value. Inasmuch as the spring itself can be made the only controlling item, the relief ports can be made of large size (to pass the heaviest grease) and the same device will still be effective when used with light greases. The relief is automatic in operation and an operator is not forced to remember to take out some bottom plug (as in earlier and conventional arrangements) or clean out some bottom relief hole which may have become caked with dried grease. Where grease is a lubricant the grease has a soap vehicle which holds oil, the latter being the only effective lubricant. The oil is allowed to bleed out at a rate just sufficient to properly lubricate parts and the free oil is credited with the major part of the lubrication. A given amount of grease has a definite amount of oil held in it and when this oil is exhausted the grease is dead. Only the soaps remain, either as a gummy mass or as a dry cracked cake. In conventional practice, where a grease relief is located at a bottom drain plug, oil often escapes from the grease to such an extent that the grease will cake up at the bottom drain thereby to render the latter completely ineffective. With the present invention, however, the newest grease is always adjacent the relief ports and the relief holes are self-cleaning since the new grease continually pushes out or clears a path through the old grease already in the fitting. Furthermore, the tightly fitting circlet closure spring provides an atmospheric seal which keeps the lubricant within the fitting relatively soft for periods best expressed in terms of years, while at the same time the construction of the invention provides a visual indication of adequate lubrication. While it has been known in the past to have grease relief schemes which are embodied as part of the entrance fitting, such prior art arrangements usually have open or loosely covered ports which not only allow contamination by foreign matter but also permit exposed grease to bleed or oxidize to a hard caked mass which prevents or impedes the relief action. With my invention, however, the circlet spring fits so tightly and smoothly that it prevents entrance of foreign matter and also effectively prevents such grease oxidation from occurring. Grease in the fitting of the invention acts as though it were in its original sealed container, where air is excluded, and, under this condition, the grease stays soft for many years.

While I have illustrated and described a particular embodiment of the invention, further modifications and improvements will occur to those skilled in the art. I desire it to be understood therefore, that this invention is not limited to the embodiment shown, and I intend in the appended claims to cover all modifications within the spirit and scope of this invention.

What I claim as new and desire to secure by Letters Patent of the United States is:

1. A pressure controlling lubricant receiving fitting having a main body portion provided with an axial bore therethrough and terminating in a nipple adapted to receive a mating fitting for the introduction of lubricant under pressure to said axial bore, said body portion having a plurality of outer lands defining an annular groove and having transverse passageways interconnecting said axial bore and said annular groove, and means including a circlet spring having a constant force deflection characteristic and arranged in said groove to cover said transverse passageways to prevent the discharge of lubricant through said passageways until a predetermined pressure is reached within said bore at which time said constant force deflection characteristic circlet spring will suddenly extend outwardly to rapidly discharge lubricant to said annular groove.

2. A unitary lubricant receiving and lubricant pressure relief device comprising a body having a bore extending therethrough, a nipple having a bore communicating with said first bore, a plurality of circumferentially spaced passageways extending radially outward from said first bore through said body, and means including an overlapping cylindrically arranged thin strip of spring material prestressed to form a spring coil having a constant force-deflection characteristic and surrounding said body portion and covering said plurality of passageways, whereby said passageways are kept closed until lubricant is injected through said nipple bore under a pressure sufficient to cause said spring material to leave said passageways thereby to prevent putting lubricant under too great a pressure through said device.

3. A bearing construction for a dynamoelectric machine having a shaft, a bearing adapted to support said shaft, an end shield adapted to support said bearing, an end cap adapted to cooperate with said end shield to support said bearing and defining with said end shield a lubricant reservoir adjacent said bearing, a unitary fitting communicating with said reservoir and adapted to conduct lubricant to said reservoir and to relieve said reservoir of excess lubricant pressure, said fitting comprising a main body portion having an axial bore terminating at one end in said reservoir and at the opposite end in a nipple tip adapted to mate with a corresponding part as of a grease gun, a plurality of circumferentially spaced transverse ports communicating with said axial bore, and means including a spring formed of a relatively thin strip of spring material prestressed to form a coil in its longitudinal direction and arranged to cover said ports, said spring having a constant force-deflection characteristic whereby it will have a tendency to completely cover and completely uncover said ports depending on the pressure of lubricant applied through said tip to said axial bore to supply said reservoir.

IRVING KALIKOW.

REFERENCES CITED

The following references are of record in the file of this patent:

UNITED STATES PATENTS

| Number | Name | Date |
| --- | --- | --- |
| 1,156,328 | Thayer | Oct. 12, 1915 |
| 1,368,315 | Wygodsky | Feb. 15, 1921 |
| 2,164,449 | Delaval-Crow | July 4, 1939 |
| 2,217,737 | Ehnts | Oct. 5, 1940 |
| 2,505,949 | DeVilbiss | May 2, 1950 |
| 2,548,644 | Wightman | Apr. 10, 1951 |

FOREIGN PATENTS

| Number | Country | Date |
| --- | --- | --- |
| 593,634 | Great Britain | Oct. 22, 1947 |